(12) United States Patent
Girard et al.

(10) Patent No.: US 7,434,250 B2
(45) Date of Patent: Oct. 7, 2008

(54) DYNAMIC MANAGEMENT OF ACCESS RIGHTS LISTS IN A PORTABLE ELECTRONIC OBJECT

(75) Inventors: Pierre Girard, La Destrousse (FR); Jean-Luc Giraud, London (GB)

(73) Assignee: Gemplus, Gemenos (FR)

( * ) Notice: Subject to any disclaimer, the term of this patent is extended or adjusted under 35 U.S.C. 154(b) by 804 days.

(21) Appl. No.: 10/467,763

(22) PCT Filed: Feb. 8, 2002

(86) PCT No.: PCT/FR02/00496

§ 371 (c)(1), (2), (4) Date: Jan. 20, 2004

(87) PCT Pub. No.: WO02/065254

PCT Pub. Date: Aug. 22, 2002

(65) Prior Publication Data

US 2006/0059348 A1    Mar. 16, 2006

(30) Foreign Application Priority Data

Feb. 13, 2001    (FR) .................................. 01 01962

(51) Int. Cl.
*H04L 9/00*    (2006.01)

(52) U.S. Cl. ..................... 726/2; 726/1; 726/9; 726/26; 713/168; 713/176

(58) Field of Classification Search ............... 726/1–10, 726/17–27; 713/156, 165, 175, 176, 168
See application file for complete search history.

(56) References Cited

U.S. PATENT DOCUMENTS

| | | | |
|---|---|---|---|
| 5,224,163 A | | 6/1993 | Gasser et al. |
| 5,701,458 A | | 12/1997 | Bsaibes et al. |
| 6,237,099 B1 | * | 5/2001 | Kurokawa ...................... 726/4 |
| 6,249,869 B1 | * | 6/2001 | Drupsteen et al. ........... 713/172 |
| 6,317,832 B1 | * | 11/2001 | Everett et al. ............... 713/172 |
| 6,385,723 B1 | * | 5/2002 | Richards .................... 713/160 |
| 6,711,679 B1 | * | 3/2004 | Guski et al. ................. 713/156 |
| 6,742,120 B1 | * | 5/2004 | Markakis et al. ............ 713/184 |
| 6,839,843 B1 | * | 1/2005 | Bacha et al. ................ 713/176 |
| 7,194,623 B1 | * | 3/2007 | Proudler et al. ............. 713/164 |

FOREIGN PATENT DOCUMENTS

| | | |
|---|---|---|
| EP | 0813132 A2 | 12/1997 |
| FR | 2791159 A1 | 9/2000 |
| WO | 99/65207 A1 | 12/1999 |

* cited by examiner

*Primary Examiner*—Kambiz Zand
*Assistant Examiner*—Tongoc Tran
(74) *Attorney, Agent, or Firm*—Buchanan Ingersoll & Rooney PC

(57) ABSTRACT

Access rights lists, such as capacity or access control lists, are dynamically managed in a data processing element such as a smart card from an administrator server. To access an access rights list from the server, the list is signed in the server so that a signature can be transmitted to the card. The card compares the signature received from the server to signatures determined according to the access rights lists contained in the card and keys associated with those lists. Server access to an identified list is only authorized when it corresponds to a signature which is found among the determined signatures in the card and which is identical to the received signature.

19 Claims, 3 Drawing Sheets

| Ob \ Su | S1 | S2 | S3 |
|---|---|---|---|
| O1 | reading writing execution | reading | reading not recording not writing |
| O2 | reading | not writing reading execution | |
| O3 | reading writing execution | not reading | recording reading not execution |

MA

ACL capacity

Fig. 1

DYNAMIC MANAGEMENT OF ACCESS RIGHTS LISTS IN A PORTABLE ELECTRONIC OBJECT

This disclosure is based upon French Application No. 01/01962, filed on Feb. 13, 2001 and International Application No. PCT/FR02/00496, filed Feb. 8, 2002, the contents of which are incorporated herein by reference.

BACKGROUND OF THE INVENTION

The present invention relates in general to terms the management of rights of access, by subjects constituting users or software modules of a data processing means, to objects such as applications implemented in the data processing means. More particularly, the invention relates to the administration of accesses to resources in a portable electronic object, such as a chip card, also known as a microcontroller card or integrated circuit card, constituting the data processing means, in particular when the chip card is a multiapplication card.

Because of the greater and greater number of more and more complex applications introduced into a chip card, the management of the applications constituting the principal resources of the chip card are more and more difficult to manage. The difficulties in management are also due to the many partners participating in the allocation of access to the applications and whose interests sometimes diverge. These partners may be the manufacturer of the chip card, the distributor or operator of the chip card, and the developers of the applications in the chip card.

Nevertheless, despite this complexity, access to the chip card resources must be controlled and made secure.

At the present time, access to a processing resource, such as an application, is made by transmitting, from a terminal accepting the chip card, at least one command constituting an application protocol data unit (APDU) which contains data or a reference to data present and to be processed in the card. According to another variant, access to a resource in the card can be effected at a higher level by invoking a method of an object present in the card when the latter contains applications written in an object oriented high level programming language such as Java.

The coexistence and cooperation of several applications within the same chip card raises many problems from the point of view of security. In particular, each application has its own data for which the developer of the application defines access rights peculiar to the application. The access conditions are means of connection between external accesses which may be users of the card or software modules, such as user interfaces, and accesses internal to the card such as applications, possibly by means of other applications or other application software elements in the card.

The control of the access conditions is based on the identification of the subjects Su, such as the users, which are the "active" elements which manipulate information contained in objects Ob, such as applications, which are "passive" elements containing data. The conditions for the access of the subjects Su to the objects Ob are governed by access control rules between the subjects and the objects. Each rule comprises an access right, that is to say a link between a subject and an object in the form of an action which can be performed by the subject on the object.

It is known how to represent the conditions for access of subjects Su to objects Ob by an access matrix MA whose columns correspond to subjects and whose rows correspond to objects, as shown in FIG. 1. For example, the matrix MA relates to three subjects S1, S2 and S3, such as three users, and to three objects O1, O2 and O3, such as files and programs. Each box in the matrix at the intersection of a row and column contains access rights, that is to say privileged actions which can be performed by the respective subject on the respective object.

The access rights may be positive in order to allow a predetermined action by a subject on an object, or may be negative in order to prevent a predetermined action by a subject or an object. For example, the subject S2 can read and execute the object O2 but cannot write in this object, and the subject S3 can read the object O1 but cannot record and write to the object O1.

As is known, the access control rules are generally dealt with according to two approaches.

The first approach consists of access control lists (ACL) corresponding to the rows in the access matrix MA and each specifying rights of access by subjects to the object associated with the row. By way of example, in a multiapplication chip card of the Windows (registered trade mark) type, access control lists ACL define accesses by users to files included in the card.

Conversely, the second approach consists of capacities corresponding to the columns in the matrix MA and each specifying the access rights of the subject associated with the column over the objects. For example, the access control relates to applet methods for multiapplication smart cards of the JavaCard type in which programs in Java language have been written. The capacities are in the form of pointers making calls for accessing methods constituting objects, in predetermined applets constituting subjects.

For more simplicity, reference will be made hereinafter to the management of access control lists although the invention also relates to the management of capacities. Access control lists and capacities are to be considered to be lists of rights of access between at least one subject and at least one object.

With a present-day chip card, the modification of access control lists is reserved for only one card administration authority. After authentication of the administration authority by the card, the authority demands modifications to the access control lists, for example by adding or eliminating lists, adding or eliminating subjects in a list, or adding or eliminating access rights of a subject with respect to an object.

This single administration authority must of course comply with the requirements of the various partners participating in the production and management of the various application resources in the chip card.

SUMMARY OF THE INVENTION

The objective of the present invention is to make possible the dynamic management of access control lists or capacities in a portable electronic object of the chip card type in order to refine the management of such lists or capacities and thus permit an increase in the number of administrators authorised to act with regard to security on modifications to the access control lists or capacities.

To achieve this objective, a method for managing lists of rights of access between subjects and objects, stored in a data processing means from an external administrator entity, is characterised in that it comprises the following steps:

initially associating keys of administrator entities with access rights lists and supplying a security algorithm in the data processing means, and in order to access an access rights list from the entity:

signing the access rights list in the entity by applying determined data from the list and the key to the security algorithm in order to produce a signature, transmitting the signature from the entity to the data processing means, and comparing the signature received in the data processing means with determined signatures according to applications of determined data in lists of access rights contained in the data processing means and of keys respectively associated with these lists to the security algorithm, and allowing access of the entity to an access rights list found only in correspondence with a signature found amongst the determined signatures in the data processing means and identical to the received signature.

Thus, according to the invention, any authorised administrator accesses an access rights list constituting an access control list or a capacity in a data processing means consisting for example of the microcontroller of a portable electronic object. An access right authorises or prohibits one or more subjects from performing an action on a subject, or a subject from performing an action on one or more objects. This access control list or capacity is then managed dynamically by each administrator, by obliging it first to sign the access control list or the capacity to which it wishes to gain access, so as to be recognised in the electronic object by its signature of the access control list or of the capacity.

Management of the access control lists is thus decentralised in administrator entities external to the data processing means.

According to another characteristic of the invention, the duration of application of an access rights list is limited. More precisely, before authorising access of the entity to the control list, a duration of life parameter of the access rights list found is updated in order to erase the access rights list found when the duration of life parameter updated exceeds a maximum limit and in order to allow access to the access rights list found to the entity when the duration of life parameter updated is less than the maximum limit. The limited duration of life of an access rights list then prompts the subject or subjects affected by this list which has become out of date and is now erased to return to the administrator or administrators of this list in order to once again request access rights from them.

The invention also relates to a data processing means in particular in a portable electronic object, storing access rights lists managed from at least one external administrator entity, implementing the method of the invention. It is characterised in that it comprises:

a means for storing keys of administrator entities in association with access rights lists, a means for implementing a security algorithm, a means for determining signatures according to applications of determined data of the lists of access rights and keys respectively associated with these lists to the algorithm, a means for comparing a received signature of an access rights list which results, in the entity, from the application of determined data of the list and of the key of the entity to the algorithm and which is transmitted by the entity, to the said determined signatures, and a means for authorising access of the entity to an access rights list found only in correspondence with a signature found amongst the determined signatures and identical to the received signature.

The data processing means can also comprise a means for storing a duration of life parameter and a maximum duration limit for each access rights list, and a means for updating the duration parameter of the list found in order to erase the access rights list found when the duration of life parameter updated exceeds the maximum limit and in order to authorise access to the access list found to the entity when the duration of life parameter updated is less than the maximum limit.

BRIEF DESCRIPTION OF THE DRAWINGS

Other characteristics and advantages of the present invention will emerge more clearly from a reading of the following description of several preferred embodiments of the invention with reference to the corresponding accompanying drawings, in which:

FIG. 1 is a diagram showing a control matrix between three subjects and three objects, already commented on according to the prior art;

DETAILED DESCRIPTION OF THE INVENTION

Figure 2:
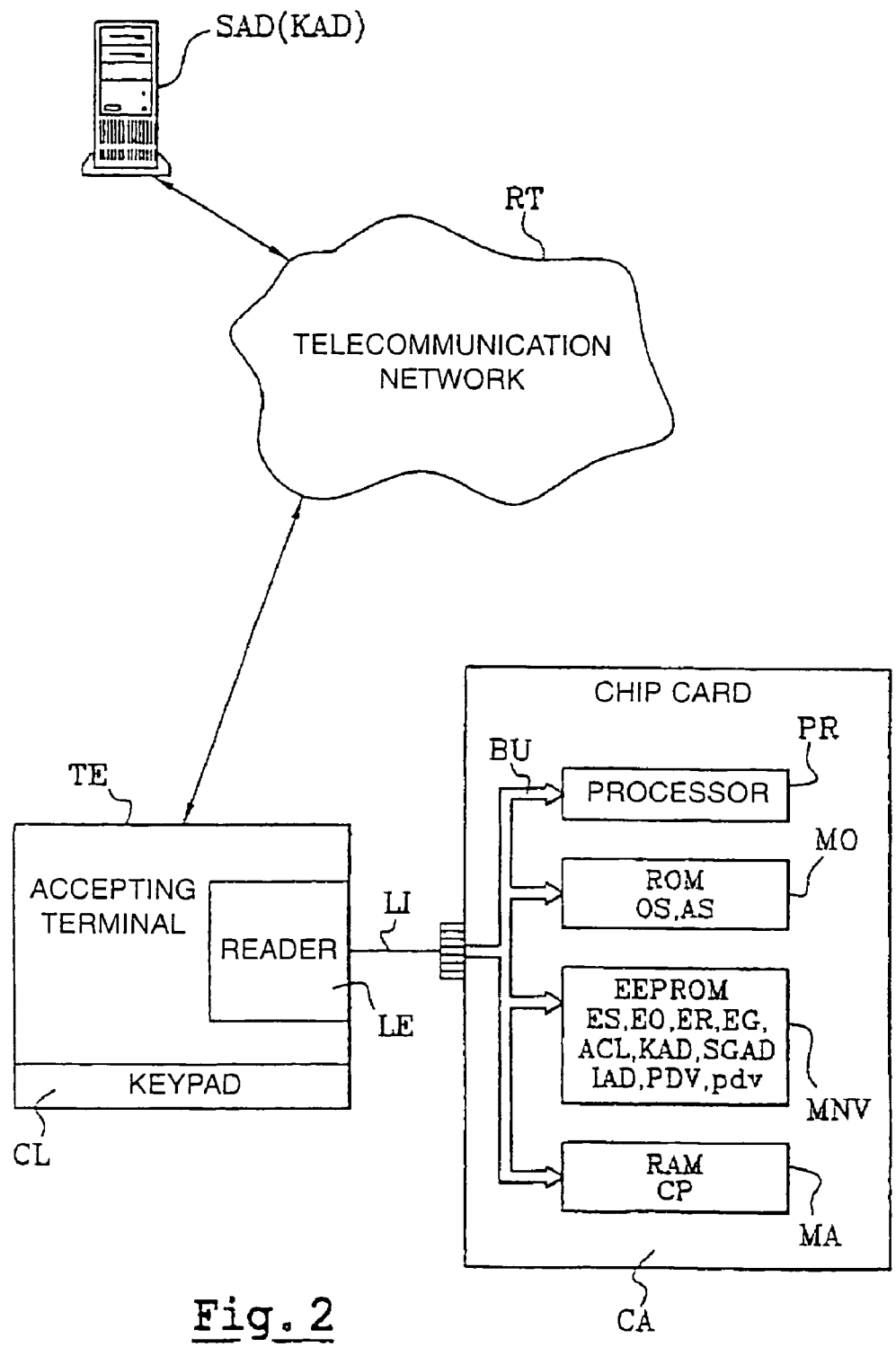
FIG. 2 is a schematic block diagram of a telecommunications system between an administrator server and a portable electronic object of the chip card type for implementing the management method according to the invention.

With reference to FIG. 2, the data processing means is a controller, such as the microcontroller of a chip card CA which contains several applications constituting objects to which subjects, such as users or units or software means, can gain access according to access rights.

In a known manner, the microcontroller of the chip card CA comprises a microprocessor PR, a memory MO of the ROM type, a non-volatile memory MNV of the programmable and erasable type, such as a EEPROM memory, and a memory MA of the RAM type receiving in particular data from a terminal TE accepting the card.

In the memory MO there are included in particular an operating system OS of the card, communication, authentication and service applications AP constituting objects Ob, as well as a security algorithm AS used for recognising administrator signatures and an algorithm for managing access rights lists AG according to the invention.

The memory MNV contains data in particular relating to the possessor of the card and to the supplier of the card, as well as access control lists ACL(Ob), or capacities.

Each access control list relating to a respective object Ob, to which reference is made below as an access rights list, contains, as shown in FIG. 1, a list of subjects Su each associated with a list of positive access rights authorising and/or negative access rights prohibiting the performance of actions on the respective object Ob. The memory MNV thus contains a subject set ES, an object set EO, that is to say a set referring to applications, and an access rule set ER. The memory MNV preferably also contains a subject group set EG. Each group Gp contains subjects Su each having at least one predetermined access to a predetermined object Ob; thus a subject in a group Gp has all the access rights granted to this group, and a subject can belong to one or more groups. A rule R for access to an object Ob concerns an action, such as for example reading, writing, execution or recording, which is authorised or prohibited to a subject Su or to a subject group Gp on an object Ob. Consequently an access control list ACL(Ob) relates to access rules for predetermined subjects and/or predetermined groups on the respective object Ob.

According to the invention, when the card is manufactured, or before the card CA is brought into service, that is to say before it is passed to the owner of the card, administrators of the lists ACL contained in the card are defined at an initial step ET01. Each administrator AD is defined by a respective administrator key KAD which is associated with one or more access control lists ACL to which the administrator AD has access. Each access control list ACL is associated with an administrator sub-list consisting of the corresponding administrator keys KAD. As will be seen hereinafter, the administrator key list KAD is preferably supplemented by an administrator signature list SGAD. A signature represents the access control list ACL signed by the respective administrator according to the security algorithm AS. Thus, according to the invention, the administrator keys KAD and preferably the administrator signatures SGAD are previously written in the non-volatile memory MNV of the chip card CA in correspondence with the access control lists ACL.

FIG. 2 also shows diagrammatically an administrator entity external to the card CA in the form of an administrator server SAD connected to the chip card through a telecommunication network RT and the accepting terminal TE. The telecommunication network RT designates any type of telecommunication network, or combination of networks, such as a radiotelephony network, a switched telephone network, an integrated service digital network ISDN, a high-rate network of the ATM type, the Internet, a packet transmission network, etc.

The server SAD represents an administrator or several administrators. Other administrators can be situated at other distant servers (not shown). The administrator AD is for example the distributor of the chip card CA, or a partner commercially associated with this distributor, or the developer of one or more applications AP constituting objects Ob implemented in the chip card CA. As a variant, an administrator himself possesses a chip card which is housed in an additional reader of the server SAD so that the server SAD reads in the chip card the references of the administrator such as an administrator identifier IAD and an administrator key KAD.

As shown schematically also in FIG. 2, the accepting terminal TE is provided with a keypad CL and a reader LE for receiving the chip card CA and connecting thereto by means of an electrical-contact connection LI according to this embodiment. The accepting terminal TE is for example a chip card commissioning terminal, a bank terminal, or a point of sale terminal, or a mobile telephony terminal in which the chip card CA constitutes a removable subscriber identity module SIM or an additional chip card when the mobile terminal is provided with an additional card reader.

After the initial step ET01, the management method according to the invention preferably comprises a second initial step ET02 during which administrator signatures SGAD are determined. Step ET02 is also implemented for a list ACL which has just been modified or introduced into the memory MNV in the card CA. Each signature SGAD of an administrator SAD depends on the key KAD of the administrator and determined data in an access control list ACL with which the key KAD is associated. The determined data in the access control list ACL depend essentially on the characteristics of the objects Ob and the subjects Su and/or groups of subjects Gp each having at least one right of access to the object Ob, as well as where applicable access rights characteristics. The list ACL and the key KAD are applied to the security algorithm AS, the result of which constitutes the administrator signature SGAD.

Figure 3:
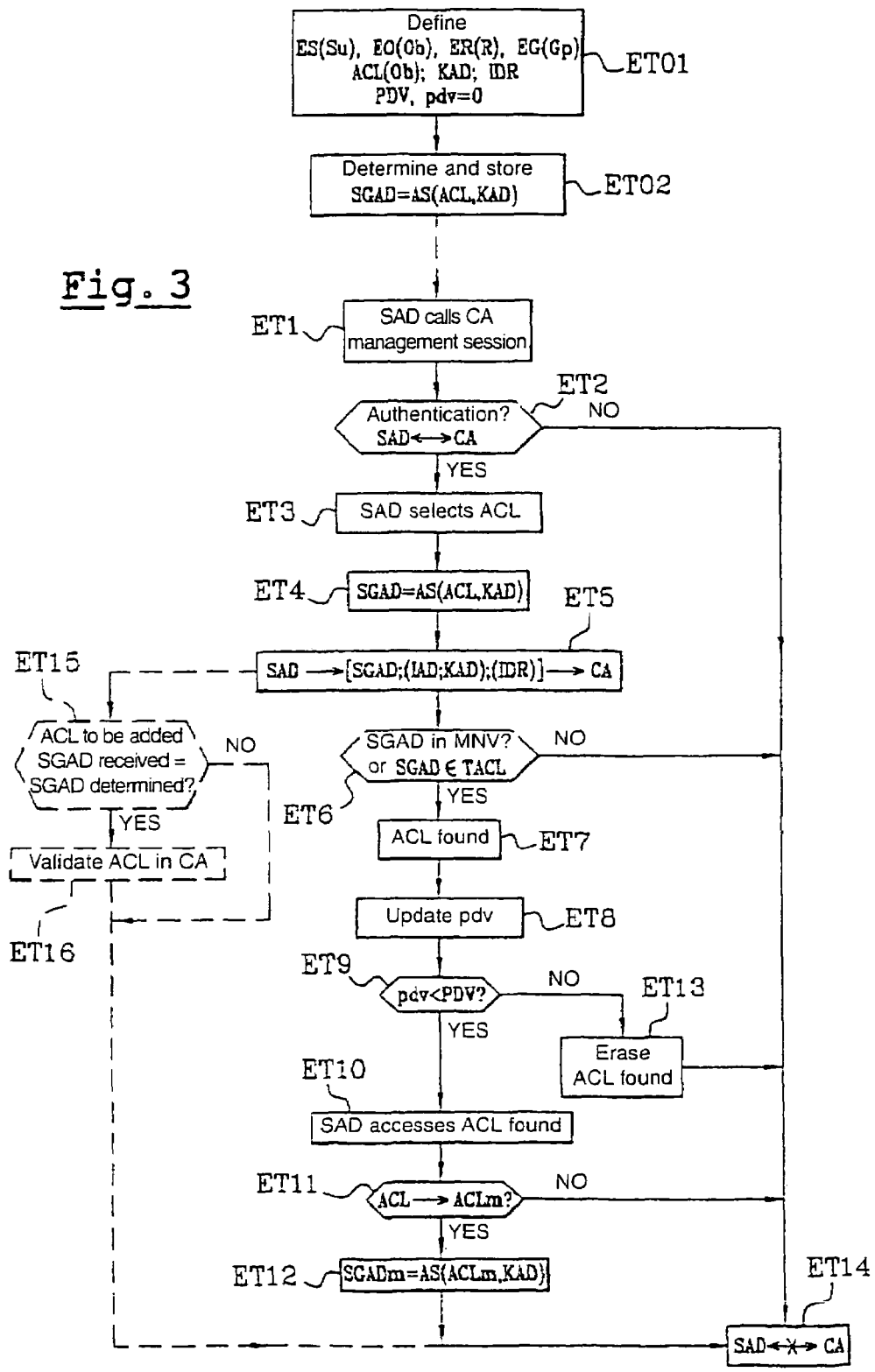
FIG. 3 is an algorithm of steps of the method of dynamic management of access rights lists according to the invention.

The management method shown in FIG. 3 comprises principally steps ET2 to ET14 triggered by a first step ET1 during which the administrator server SAD requests the establishment of a call with the accepting terminal TE containing the chip card CA through the telecommunication network RT, so as to initiate an access control list management session with the chip card CA.

At the start of this session the card CA attempts to authenticate the administrator SAD at step ET2. The authentication is conventional and consists essentially in transmitting a random number by means of the chip card CA to the server SAD and comparing in the chip card CA the results of the application of this random number and of an authentication key prestored in the card CA and the server SAD, performed both in the card CA and the server SAD. Conversely, the server SAD authenticates the chip card CA. According to another variant, the authentication is mutual and comprises an authentication of the server SAD by the card CA and an authentication of the card CA by the server SAD. If the authentication or one of the authentications at step ET2 gives different results in the server SAD and the chip card CA, the call is broken off at a final step ET14.

In a variant, the management method comprises no authentication.

When the authentication has succeeded, the administrator server SAD selects an access control list ACL which it has under management locally in a table of access control lists, at the following step ET3, although the administrator can manage only one access control list ACL. The server SAD next signs the selected access control list ACL by applying the determined data of the list ACL and the key KAD of the administrator server SAD to the security algorithm AS so as to produce an administrator signature SGAD at step ET4.

In a variant, instead of itself signing the access rights list ACL and producing the administrator signature SGAD, the server SAD receives this signature SGAD transmitted by another main administrator editor, such as a main administrator server connected to the telecommunication network RT, after the main administrator server has authenticated the server SAD.

Then the signature SGAD constituting the selected access control list ACL signed is transmitted by the server SAD to the chip card CA through the network RT and the terminal TE in the form of an appropriate message at step ET5. This message can contain other data such as an administrator identifier IAD which designates a respective table of access control lists TACL in the chip card CA. The table TACL contains identifiers of access control lists to which the administrator server SAD has access, and preferably contains signatures of these access control lists signed by the administrator server SAD.

At the following step ET6, in response to the administrator signature SGAD, the microprocessor PR in the chip card CA seeks an access control list which is able to be signed by the administrator server SAD. This search can consist in determining all the administrator signatures respectively associated with the access control lists which the chip card CA contains, and then comparing the signatures determined with the signature SGAD received by the card CA.

However, as indicated at step ET02, the processor PR of the chip card CA has preferably, prior at least to step ET5, determined the signatures SGAD corresponding to all the administrators respectively associated with the access control lists ACL and has written them in EEPROM memory MNV. The processor PR then compares the signature SGAD received at step ET5 only with the signatures previously determined and classified in the table TACL. If the processor PR finds no administrator signature in memory MNV identical to the signature SGAD transmitted by the server SAD, the processor PR invites the accepting terminal TE to break off the communication at step ET14.

In a variant, when the administrator identifiers IAD are provided in the memory MNV, the processor PR compares the received signature SGAD only with the signatures contained in the table TACL designated by the received identifier IAD and associated with the key KAD, that is to say only with the signatures associated with access control lists to which the administrator server SAD has access.

Thus, after step ET6, an access control list ACL corresponding to the received administrator signature SGAD is found in order to process it by means of the server SAD, as indicated at step ET7. Although, according to a simple variant, step ET7 is followed by a step ET10 allowing access of the administrator server SAD to the access control list ACL previously found, the invention provides intermediate steps ET8 and ET9 during which a duration of life parameter pdv of the access rights list ACL found is updated and compared with a maximum limit PDV.

The parameter pdv and the limit PDV are written in the memory MNV of the card. The limit PDV expresses the duration of life of the access control list ACL found at step ET7 and is prestored in the memory MNV at the initial step ET01, when the card CA is manufactured or brought into service, or when there is an addition of the list ACL, as will be seen subsequently. At the initial step ET01, the duration of life parameter pdv is zeroed so that it is incremented each time step ET8 is executed.

The duration of life parameter pdv can be a cumulative duration of sessions of use of the chip card CA expressed in hours and minutes like the limit PDV. According to a second variant, the parameter pdv is a cumulative duration of absolute time expressed in terms of date and time, the limit PDV then designating a maximum predetermined duration or an expiry date of the determined list ACL. The updating of the duration can be carried out in the card CA by interrogating a trustworthy time stamping device, for example included in the terminal TE, or in the administrator server SAD.

According to other variants, the duration of life parameter pdv is a number of sessions of use of the chip card CA, or a number of sessions using the list of access rights found ACL, the limit ACL being a maximum number of sessions.

According to yet another variant, the duration of life parameter pdv is a number of commands APDU received by the chip card CA, the limit PDV then being a maximum number of commands.

According to yet another variant, the duration of life parameter is a synchronisation value changed periodically in the administrator servers and transmitted to the card by any administrator server SAD in each message which contains the signature SGAD of the list of access rights sought ACL, at step ET5, the limit PDV being at the maximum number.

Step ET8 thus increments the duration of life parameter according to its nature, the increment being in particular a period or a difference in date, or a unit, or a number of commands.

If at step ET9 the duration of life parameter pdv exceeds the limit PDV, the processor PR erases the access control list ACL which was found at step ET7 and all the data associated with the list ACL at step ET13, and breaks off the communication with the server SAD at step ET14. In a variant, step ET13 only partially erases the list found, for example by erasing therein only the positive or negative access rights.

If the duration of life is not yet reached at step ET9, the administrator server SAD is authorised to effectively gain access to the access control list ACL found, at step ET10. The server SAD then proceeds with a modification of the access control list found ACL. This modification consists for example in totally erasing the access control list ACL in the memory MNV, or modifying one of the data in the list found ACL, in particular eliminating or adding a subject Su in the access control list found with corresponding access rights R, or eliminating or adding at least one access right R relating to a subject Su included in the list found. The modification can also consist in adding a new administrator key to be associated with the list found and included in the message transmitted at step ET5.

If at step ET11 the access control list found ACL has not been modified or has been erased, the method passes directly to the breaking off of the communication at step ET14. On the other hand, if the access list found ACL has been modified by the server SAD, this modified list being designated by ACLm, the processor PR determines, at step ET12, new administrator signatures SGADm resulting from the application of the determined data in the modified access control list ACLm and respectively administrator keys KAD associated with the list, to the security algorithm AS. The signatures SGADm replace the previous signatures SGAD so that, during a future list management session, the administrator server SAD can access the control list ACLm thus modified in the memory MNV of the card CA.

Then the management method ends with the breaking off of the communication between the server SAD and the card CA at step ET14.

When an access control list established in the administrator server SAD is to be added in the memory MNV of the chip card CA, steps ET1 to ET5 are executed, the message transmitted at step ET5 also containing the list ACL to be added with the administrator keys KAD associated with the list. Then, in place of steps ET6 to ET13, the processor PR determines and stores the signatures SGAD of the list received in the respective list tables TACL in the card CA. For each administrator associated with the list, the respective signature SGAD results from application of the determined data of the list and of the respective key KAD received to the security algorithm AS. The processor PR compares the signatures determined with the signature received, as shown at a step ET15 in dotted lines in FIG. 3. The recording of the list received and of the keys and associated administrator signatures in the memory MNV is validated at a step ET16 when one of the signatures determined is identical to the signature received. Otherwise step ET14 breaks off communication between the server SAD and the card CA.

According to a variant of the embodiment described above, the server SAD is an entity delegated by another administrator server which has transmitted to it delegation rights information IDR. Delegation rights information IDR was previously stored in the memory MNV of the chip card CA at the initial step ET01 and is transmitted in the message containing the administrator signature SGAD at step ET5. At step ET6, the chip card CA authorises access to the access control list ACL when both the signature SGAD is recognised in the table TACL associated with the key KAD of the server SAD and the delegation rights information IDR is detected in association with the list ACL recognised in the table TACL of the card. Otherwise communication is broken off at step ET14.

Although the invention has been described in relation to a chip card containing access control lists associated respectively with signatures, the chip card can also contain access control lists which are not signed. Thus an administrator server SAD can decide to erase all the access control lists loaded in the chip card CA and associated with the key KAD of the server SAD, transmitting the corresponding signatures at step ET4.

As already stated, everything which has been described above for access control lists in the chip card CA, or in any other portable electronic object such as a personal electronic assistant or organiser, an electronic purse, a token or a pocket calculator, is applicable to an access rights list making several subjects correspond to an object, such as a capacity.

The invention claimed is:

1. A method for managing lists of rights of access between subjects and objects, stored in a data processing means from an external administrator entity comprising the following steps:
    initially associating keys of administrator entities with access rights lists and storing a security algorithm in the data processing means, and
    subsequently accessing an access rights list from the entity by:
    signing the access rights list in the entity by applying determined data from the list and an associated key to the security algorithm in order to produce a signature,
    transmitting the signature from the entity to the data processing means,
    comparing the signature received in the data processing means with determined signatures according to applications of determined data in lists of access rights contained in the data processing means and of keys respectively associated with these lists to the security algorithm, and
    allowing access of the entity to an access rights list only if its determined signature is identical to the received signature.

2. A method according to claim 1, wherein the association of the keys with the access rights lists is performed in advance in the processing prior to bringing the data processing means into service.

3. A method according to claim 1 wherein the association of the keys with an access rights list to be added to the data processing means is performed by transmitting the list with the keys from the entity to the data processing means, and determination of signatures of the list received in the data processing means is performed by applying the determined data in the list received and the keys received to the algorithm, and validation of the recording of the list received in the data processing means occurs when one of the signatures determined is identical with the signature received.

4. A method according to claim 1, wherein the signing step is replaced by the reception in the entity of a signature transmitted by another entity.

5. A method according to claim 1, wherein delegation information is transmitted with the signature, and access of the entity to the list found is not authorised when the delegation information is detected in association with the list found in the data processing means.

6. A method according to claim 1, wherein the signatures to be compared with the signature received are determined in the data processing means prior to the transmitting step.

7. A method according to claim 1, further including the step before authorising access of the entity to the access rights list, of updating a duration of life parameter of the access rights list found in order to erase the access rights list found when the updated duration of life parameter exceeds a maximum limit and in order to authorise access to the access rights list found to the entity when the updated duration of life parameter is less than the maximum limit.

8. A method according to claim 7, wherein the duration of life parameter is a cumulative duration of sessions of use of the data processing means or a cumulative duration of absolute time.

9. A method according to claim 7, wherein the duration of life parameter is a number of sessions of use of the data processing means, or a number of sessions using the access rights list found.

10. A method according to claim 7, wherein the duration of life parameter is a number of commands received by the data processing means.

11. A method according to claim 7, wherein the duration of life parameter is a synchronisation value changed periodically in external administrator entities and transmitted with the signature of the access rights list.

12. A method according to claim 1, wherein the signatures of the access list associated with the keys of a list are again determined in the data processing means if the access rights list found has been modified by the entity.

13. A method according to claim 1, wherein the determined data of the list which are applied to the security algorithm depend on characteristics of at least one subject and/or at least one subject group and/or at least one object and/or at least one right of access of a subject to an object relating to the list.

14. A data processing means storing access rights lists managed from at least one external administrator entity, comprising:
    a means for storing keys of administrator entities in association with access rights lists,
    a means for implementing a security algorithm,
    a means for determining signatures according to applications of determined data of the lists of access rights and keys respectively associated with said lists to the algorithm,
    a means for comparing a received signature of an access rights list which results, in the entity, from the application of determined data of the list and of the key of the entity to the algorithm and which is transmitted by the entity, to said determined signatures, and
    a means for authorising access of the entity to an access rights list found only in correspondence with a signature found amongst the determined signatures and identical to the received signature.

15. A data processing means according to claim 14, further including a means for storing a duration of life parameter and a maximum duration limit for each access rights list, and a means for updating the duration parameter of the list found in order to erase the access rights list found when the duration of life parameter updated exceeds the maximum limit and in order to authorise access to the access list found to the entity when the duration of life parameter updated is less than the maximum limit.

16. A data processing device, comprising:
    a memory storing:
        access rights lists that are managed by at least one external administrator;
        at least one key of an administrator, and an association between the stored administrator key and at least one of the stored access rights lists; and
        a security algorithm; and
    a processor that executes the following operations:
        determining a signature for each access rights list having an associated key by applying data of the access rights list and the associated key to said algorithm,
        in response to a request from an external administrator to select an access rights list, comparing a signature received with said request to the determined signature for an access rights list, and authorizing access of the requesting external administrator to an access rights list in said memory whose determined signature matches the signature received with the request.

17. The data processing device of claim 16, wherein said memory further stores a duration of life parameter and a maximum duration limit for an access rights list, and said processor updates said parameter in response to designated events, compares the updated parameter to the stored maximum duration limit, and authorizes said access only when the updated parameter is less than said limit.

18. The data processing device of claim 17, wherein said processor deletes said access rights list from said memory when said parameter equals or exceeds said limit.

19. The data processing device of claim 16, wherein said device is an integrated circuit card.

* * * * *